Figure 1:
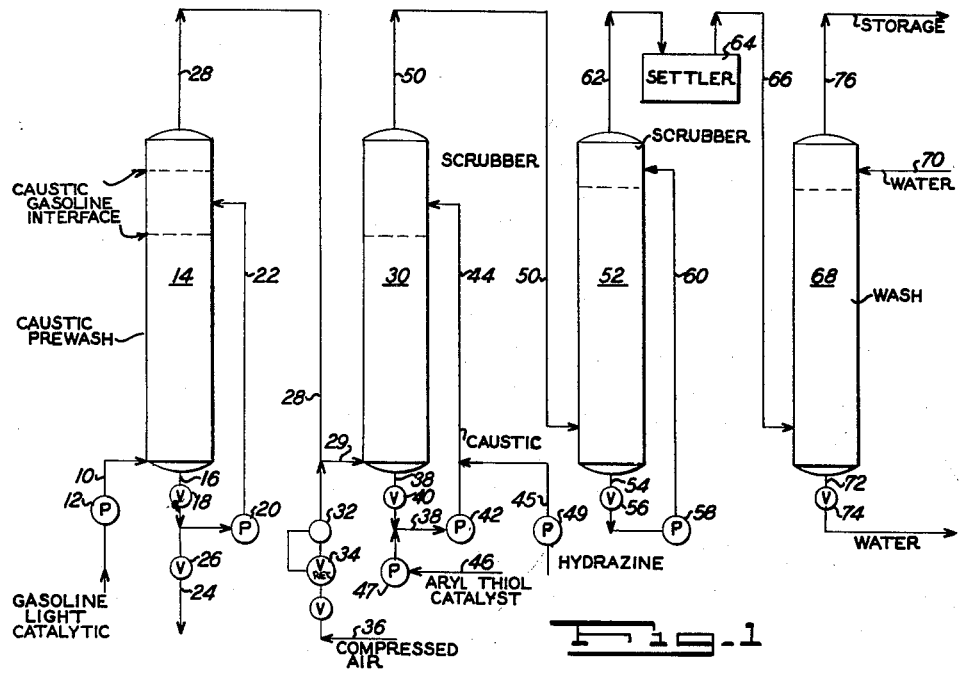

Dec. 1, 1964

C. O. PETTY 3,159,570

HYDRAZINE SWEETENING

Filed Dec. 19, 1962

INVENTOR
CHARLES O. PETTY

BY Sol B Wiegi
ATTORNEY

3,159,570
HYDRAZINE SWEETENING
Charles O. Petty, P.O. Box 840, Tyler, Tex.
Filed Dec. 19, 1962, Ser. No. 246,281
6 Claims. (Cl. 208—206)

This invention relates to air sweetening of sour naphthas with mercaptan catalyzed spent caustic containing acid oils and, more particularly, to the use of hydrazine to stabilize the catalyst caustic solution against foaming and rapid depletion of the aromatic mercaptan as well as acid oils in the catalyst solution by air oxidation, and to improve overall sweetening economy by the use of hydrazine stabilized mercaptan in the catalyst solution.

In my prior co-pending application, Ser. No. 860,601, filed December 18, 1959, now Patent No. 3,092,569, of which the present application is a continuation-in-part, I have disclosed the improved effect of aromatic mercaptan in spent caustic to catalyze air sweetening of sour distillate, that caustic catalyst solution also containing phenolic acid oils and usually derived from spent caustic. That method, while it represented an important economy because it used very economically available sweetening components such as spent caustic and acid oils and even aromatic mercaptans by further processing, all available from preliminary caustic wash treatments of sour distillates, had certain disadvantages.

For one thing, the continuous passage of air through high acid oil containing spent caustic catalyst tended to cause substantial foaming which resulted either in short cycles of use of the caustic catalysts wash tower, each requiring replacement with a fresh catalyst solution, or necessitating the use of a second wash tower to capture the foamed carryover. That second wash tower, usually a caustic wash, intended to remove slight contaminating catalyst solution, itself became contaminated too rapidly by the foam carryover. While various commercial defoamers, notably silicones and higher alcohols and alkanol amines, have been tried with some defoaming success, these have been unduly expensive for effecting that single function and resulted in large reduction in the economy of that method.

Moreover, the continuous passage of air in large quantity through the catalyst solution tended rapidly to oxidize the aromatic mercaptan which in the disulfide form becomes inactivated as a sweetening catalyst and requires rapid replenishment, thereby increasing the expense of the method despite the fact that it could be made available from preliminary wash solutions. The phenolic acid oils, also essentially present in the catalytic solution, also become oxidized in continuous wash contact with the air used for sweetening.

According to the present invention I have now found that the addition of very small quantities of hydrazine to the caustic catalyst solution not only substantially stops the foaming, but further inhibits the oxidation of at least the aromatic mercaptan in the catalyst solution. The hydrazine appears also to reduce oxidation of the acid oils contained in the caustic catalyst wash. The net result, either by inhibiting the oxidation of these active catalyst components or contributing to their effectiveness, is a more economic and improved sweetening of the sour naphtha treated therewith.

Other incidental advantages are found in the practice of this method in the need for less air to effect the sweetening. Again, in the instance of easily sweetened naphthas such as light catalytically cracked naphtha, a second caustic-containing wash tower may be eliminated, and the catalyst in the second wash tower substituted by an ordinary water washing following the single caustic-mercaptan-hydrazine treatment with air. A consequence is substantial saving in caustic for treatment of that kind of naphtha. While the hydrazine becomes ultimately oxidized by the air, the products are merely inert nitrogen and water.

In applying my improved sweetening to treatment of a light catalytic sour naphtha, after subjecting it to a preliminary caustic wash with a 20 to 50 Bé. caustic, the naphtha, flowing at about a rate of 75 to 100 gallons per minute, has added to it about ¾ to 1¼ cubic feet of air per minute, and is passed countercurrently through the catalytic scrubber in which the catalytic caustic aromatic mercaptan and hydrazine solution is rapidly circulated. The scrubbed and thus simply sweetened light catalytic naphtha is then merely given a water wash and is ready for use as a sweetened naphtha. From time to time the preliminary caustic wash solution has portions withdrawn and regenerated by passing air therethrough at 175° F., and then returning the regenerated caustic solution to the preliminary wash scrubbing tower. The catalytic scrubber solution consists of 30 to 40 Bé. caustic in water containing 5 to 30 volume percent of acid oils, from 0.01 to 3 weight percent of aryl mercaptans, typically phenyl or tolyl mercaptans. The catalyst solution further has added about 0.0001 to 0.2% of hydrazine. The caustic, the phenolic acid oils and/or the mercaptan can each be obtained by processing preliminary spent caustic solutions as described in my parent application. They may also be obtained from other commercial sources.

In operation, the catalyst solution has continuously or intermittently injected therein a diluted solution of hydrazine to impart a minute hydrazine content to the catalyst solution. Preferably the re-circulating catalyst scrubber solution has slowly injected therein a 3 to 6% aqueous hydrazine solution at the rate of about 3 to 6 pounds of hydrazine per day, which would provide a very minute content of hydrazine in the catalyst scrubber solution, usually less than 0.2% and generally even less than 0.0003%. A typical hydrazine content in the caustic scrubber solution is between about 0.0001% and 0.0003% by weight of the catalyst solution, and while the use of the larger quantities gives some improved sweetening it is much less economical.

In the treatment of sour coker or thermal gasolines, more difficult to sweeten, and having a higher content of aliphatic mercaptans, the naphtha, after being first given a pre-wash with 20 to 40 Bé. caustic solution, is passed at a rate of about 10 to 50 gallons per minute together with 1 to 2 cubic feet per minute of air through a first catalyst solution, which need not be circulated because a second catalytic contact is preferably applied to such difficultly sweetened naphtha. Moreover, the hydrazine, added in the same quantity as in the catalytic naphtha sweetening, can be injected into the top of the tower so that some may be carried over with the naphtha to a second scrubbing tower in which the catalytic solution is circulated. The twice catalyst treated coker or thermal naphtha is then given a final caustic wash and then a water wash.

Figure 2:
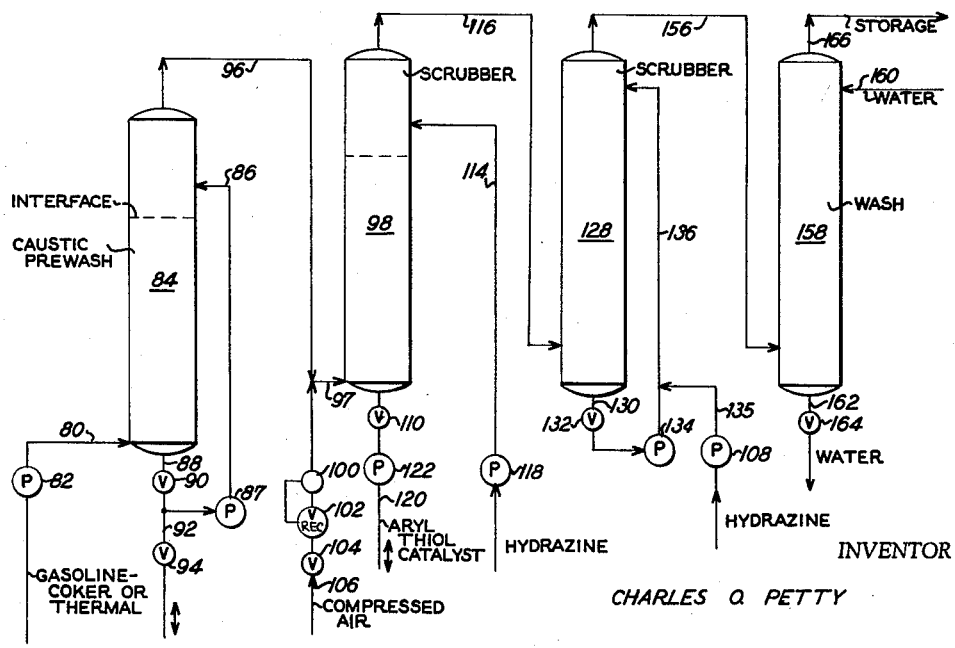

The process is further illustrated in the drawings herein:

FIG. 1 shows diagrammatically a flow sheet for sweetening of light catalytic gasoline; and FIG. 2 shows such flow sheet for sweetening of coker or thermal gasoline.

Referring first to FIG. 1, the catalytic gasoline enters the system through line 10 impelled by a pump 12 and passes to caustic pre-wash tower 14 which would contain the 20 to 50% aqueous caustic Bé. solution. The caustic mixture for washing naphtha is withdrawn through a line 16 controlled by a valve 18 and recirculated to the upper end of the tower 14 through line 22 as impelled by a pump 20 in a continuous rapid washing circulation. The treated pre-washed gasoline leaves overhead through line 28 and is mixed with air entering through line 36 as metered at 34 through valve 32, and the air mixed with the pre-washed gasoline enters through line 29 into the catalyst tower 30. The catalyst solution is withdrawn from the bottom of scrubber 30 through line 38 controlled by valve 40 and is re-circulated to a point near the top of the scrubber through line 44 as impelled by pump 42. The catalytically scrubbed naphtha then passes overhead through line 50. From time to time aryl thiol catalyst is added to the system through line 46 impelled by pump 47 to maintain the desired aromatic mercaptan content in the catalyst solution. Hydrazine solution is passed into line 44 by way of line 45 impelled by a proportioning pump 49 to impart the desired hydrazine content to the catalyst solution. The catalytically sweetened naphtha enters a second scrubber 52 from line 50 and is here usually scrubbed only with water, which can be re-circulated by way of line 54, valve 56, pump 58, and line 60. The scrubber 52 could also be used with catalyst solution and operated like scrubber 30, but this is generally not necessary with light catalytically cracked gasolines which are easy to sweeten. The scrubber sweetened naphtha in tower 52 leaves overhead through line 62 and passes to a settler 64 from which any caustic contaminated water is settled out, the naphtha being passed by line 66 through a second water washing scrubber 68, fresh wash water entering at 70 and being withdrawn at the bottom through line 72 controlled by valve 74. The sweetened washed catalytic naphtha leaves overhead through line 76, passing thence to storage.

For the treatment of more difficult to sweeten naphthas such as coker or thermal gasoline, as shown in FIG. 2, the naphtha enters a caustic pre-wash tank 84 through line 80 as impelled by pump 82. The caustic pre-wash solution is circulated by being withdrawn through the bottom at line 88 controlled by valve 90 and returned to a point near the top through line 86 as impelled by a pump 87. The caustic pre-washed naphtha passes overhead through line 96 and is mixed with a quantity of air entering line 106 metered at 102 through valve 100, the flow being further controlled by valve 104. The air and naphtha mixture in line 97 enters the catalytic scrubber 98, where it is contacted with the catalytic solution. That catalyst solution is adjusted in aromatic mercaptan content entering through line 120 impelled by a pump 122 as controlled by valve 110. Similarly, hydrazine solution is passed into the system through line 114 by pump 118. The once catalytically scrubbed naphtha leaving overhead through line 116 enters a second scrubber 128 in which the catalyst mixture is withdrawn at the bottom through line 130 controlled by a valve 132 and returned to a point near the top by a line 136 as impelled by a pump 134. Additional hydrazine is passed into the second circulating catalyst solution through line 135 as impelled by a pump 108. The twice scrubbed and sweetened naphtha passes overhead in line 156 to a final wash tower 158 where it is contacted with fresh wash water entering through line 160 near the top, the wash water being withdrawn at the bottom through line 162 as controlled by valve 164. The sweetened thermal or coker naphtha leaves the system through line 166, passing thence to storage.

The caustic in the pre-wash towers 14 and 84 is withdrawn from time to time, as shown in FIG. 1, through line 24 as controlled by valve 26, or, as shown in FIG. 2, by line 92 controlled by valve 94. The spent caustic is regenerated by passing air pre-heated to about 175° F.

The following examples illustrate details of sweetening of various naphthas.

EXAMPLE I

A light catalytically cracked gasoline containing .004 weight percent RSH, as sulfur, is first pre-washed with 35 Bé. caustic soda solution and then passed at a rate of 86 gallons per minute together with 1 cubic foot of air per minute countercurrently through a washing tower of caustic solution containing aromatic mercaptan, hydrazine and acid oils, catalyst. The catalyst is circulated countercurrently in wash contact with the air and naphtha from top to bottom against the naphtha at a rate between 13 and 14 gallons per minute. The catalyst consists of 35 Bé. caustic containing 25 volume percent acid oils obtained from spent caustic pre-washing of cracked naphthas to which had been added 3 weight percent of mixed phenyl and tolyl mercaptan. Into the circulating catalyst solution and scrubber there is injected ½ gallon 4.3 pounds per day of 44.8% hydrazine which has been diluted for handling to a total of 5½ gallons with water. It is found that no foaming takes place in the catalyst scrubber solution. The RSH sulfur is reduced from about 0.0006% to 0.0002% on the average. The color of the light catalytic naphtha is likewise improved in the wash, being reduced from 135 or poorer down to 35. No second caustic scrubber is used in this treatment of the catalytically cracked naphtha, the treatment following the catalyst scrubbing consisting merely of a water wash.

EXAMPLE II

On a laboratory scale 5 ml. of the same light catalytic gasoline was placed in a gas scrubbing bottle to which was added 200 ml. of catalytic spent caustic containing 3 weight percent of aryl mercaptans and 36 volume percent of phenols, and 200 ml. of 50 Bé. caustic soda in water. Air was passed into the liquid mixture through a fitted glass dispersion tube at a rate fast enough to effect a mixture. Samples were run with and without hydrazine. The following table shows in tabular form the results obtained.

*Table I*

COMPARISON OF ARYL-MERCAPTAN DISAPPEARANCE FROM AERATED CAUSTIC WITH AND WITHOUT HYDRAZINE

| Hours of Air | Without Hydrazine | | | | With Hydrazine (0.15 Wt. Percent) | | | |
|---|---|---|---|---|---|---|---|---|
| | Caustic | | Gasoline | | Caustic | | Gasoline | |
| | Wt. Percent RSH | Foam, mm. | Wt. Percent RSH | Color* | Wt. Percent RSH | Foam, mm. | Wt. Percent RSH | Color |
| 0 | 0.53 | 75 | 0.065 | 10 | 0.53 | 10 | 0.065 | 10 |
| 24 | 0.40 | 80 | 0.0006 | 60 | 0.48 | 15 | 0.0003 | 15 |
| 48 | 0.33 | 80 | 0.0004 | 150 | 0.44 | 20 | 0.0002 | 25 |
| 72 | 0.13 | 80 | 0.0004 | 200 | 0.36 | 20 | 0.0002 | 30 |
| 96 | 0.06 | 80 | 0.0004 | 250 | 0.27 | 20 | 0.0002 | 35 |

*Distilled Water=0.

It will be noted that the caustic was continuously re-used with each batch of fresh naphtha treated and, consequently, there was a continuous reduction in the aryl mercaptan content of the caustic as determined by silver nitrate titration. In comparison with and without the hydrazine it will be noted that the quantity of aryl mercaptan in the caustic scrubber solution was higher due to the presence of the hydrazine. It will also be noted that the quantity of foam or the height of the foam column was very much lower with the hydrazine. Finally, it will be noted that, while the color of the treated naphtha was progressively higher by the continued re-use of the caustic scrubber solution, this overall color was comparatively better where the hydrazine was present.

EXAMPLE III

The experimental run of Example II was repeated for purposes of determining the effect on the quantity of aryl mercaptan by the use of different additives. For this purpose a spent caustic as in Example II was used containing initially 0.4 weight percent of aryl mercaptan. In a first series of experiments the catalyst had added to it 0.15 weight percent of hydrazine. In a second series the catalyst had added 0.75 weight percent of sodium sulfite. In a further control series no additive was used other than the initial 0.4% mercaptan and spent caustic. The following table lists the results obtained in the series of tests.

*Table II*

COMPARISON OF ARYL-MERCAPTAN DISAPPEARANCE FROM AERATED CAUSTIC AND CAUSTIC CONTAINING (1) HYDRAZINE, (2) SODIUM SULFITE

| Hours of Air | Caustic Containing 0.40 Wt. Percent Aryl-Mercaptans | | |
|---|---|---|---|
| | 0.15 Wt. Percent Hydrazine | 0.75 Wt. Percent $Na_2SO_3$ | No Additive |
| 0 | 0.40 | 0.40 | 0.40 |
| 24 | 0.40 | 0.37 | 0.29 |
| 48 | 0.37 | 0.29 | 0.13 |
| 72 | 0.30 | 0.23 | 0.07 |
| 96 | 0.21 | 0.09 | 0.04 |

It will be noted that after 96 hours of continuous aeration the spent caustic to which hydrazine had been added still contained 0.21 weight percent of aryl mercaptan. In the instance of the use of sodium sulfite, after 96 hours a treatment with air, the spent caustic still contained 0.09 weight percent of aryl mercaptan. In the instance of the control, having no additive to protect the aryl mercaptan, the latter was reduced after 96 hours to 0.04 weight percent. It is apparent that the effect of the hydrazine to stabilize the aryl mercaptan is substantial and far more effective than a standard reducing agent such as sodium sulfite, even though the sulfite was used in much greater quantity.

EXAMPLE IV

In a series a full scale plant runs, wherein the same quantity of hydrazine, when used, was as in Example I, the condition of the catalyst solution and the quality of the light catalytic gasoline produced is analyzed every other day. A comparison is given of three plant runs both before and after hydrazine injection.

*Table III.—Plant Data*

RUN #1—BEFORE HYDRAZINE INJECTION

| Days | Caustic | | | Gasoline (Lt. Cat.) | |
|---|---|---|---|---|---|
| | Percent RSH | Percent Acid Oils | Bé. Gr. | Percent RSH | Color |
| 0 | 1.0 | 10.0 | 39.0 | 0.0006 | 150 |
| 3 | 0.60 | 10.0 | 39.0 | 0.0006 | 150 |
| 5 | 0.35 | 10.0 | 39.0 | 0.0006 | 150 |
| 7 | 0.18 | 8.0 | 39.0 | 0.0009 | 150 |
| 10 | 0.03 | 8.0 | 39.0 | 0.0013 | 150 |
| 10 [1] | | | | | |
| 11 | 0.30 | 8.0 | 38.0 | 0.0004 | 150 |
| 13 | 0.10 | 8.0 | 37.5 | 0.0006 | 150 |
| 13 [1] | | | | | |
| 15 | 0.32 | 10.0 | 37.5 | 0.0004 | 150 |
| 17 | 0.24 | 10.0 | 37.5 | 0.0006 | 150 |
| 19 | 0.16 | 10.0 | 37.5 | 0.0006 | 150 |
| 20 | 0.10 | 10.0 | 37.5 | 0.0006 | 150 |
| 21 [1] | | | | | |
| 22 | 0.30 | 10.0 | 37.5 | 0.0004 | 150 |
| 24 | 0.18 | 8.0 | 37.5 | 0.0006 | 150 |
| 26 | 0.09 | 8.0 | 37.5 | 0.0013 | 150 |
| 26 [1] | | | | | |
| 27 | 0.33 | 10.0 | 37.5 | 0.0006 | 150 |
| 29 | 0.20 | 10.0 | 37.5 | 0.0009 | 150 |
| 30 | 0.09 | 8.0 | 37.5 | 0.0013 | 150 |

RUN #2—AFTER HYDRAZINE INJECTION

| Days | Caustic | | | | Gasoline (Lt. Cat.) | |
|---|---|---|---|---|---|---|
| | Percent RSH | Percent Acid Oils | Bé. Gr. | Vol. Percent Hydrazine | Percent RSH | Color |
| 0 | 1.17 | 16 | 40.0 | 0.05 | 0.0013 | |
| 1 | 1.09 | 16 | 39.5 | 0.05 | 0.0012 | |
| 2 | 1.00 | 15 | 39.5 | 0.05 | 0.0007 | |
| 3 | 1.00 | 15 | 39.5 | 0.05 | 0.0003 | 35 |
| 5 | 0.80 | 12 | 39.5 | 0.05 | 0.0003 | 35 |
| 7 | 0.54 | 12 | 39.5 | 0.05 | 0.0005 | 35 |
| 9 | 0.48 | 10 | 39.5 | 0.05 | 0.0005 | 35 |
| 11 | 0.43 | 10 | 39.5 | 0.05 | 0.0005 | 35 |
| 14 | 0.31 | 10 | 39.5 | 0.025 | 0.0006 | 35 |
| 16 | 0.30 | 10 | 39.5 | 0.025 | 0.0004 | 35 |
| 18 | 0.26 | 10 | 39.5 | 0.025 | 0.0004 | 35 |
| 21 | 0.19 | 10 | 39.5 | 0.025 | 0.0004 | 35 |
| 21 [1] | | | | | | |
| 22 | 0.35 | 10 | 39.0 | 0.025 | 0.0005 | 35 |
| 23 | 0.28 | 10 | 39.0 | 0.025 | 0.0005 | 35 |
| 24 | 0.21 | 10 | 39.0 | 0.025 | 0.0005 | 35 |
| 25 | 0.17 | 10 | 39.0 | 0.025 | 0.0005 | 35 |
| 28 | 0.13 | 10 | 39.0 | 0.025 | 0.0005 | 35 |

RUN #3—AFTER HYDRAZINE INJECTION

| 0 | 0.84 | 10 | 41.5 | 0.025 | 0.0002 | 40 |
| 3 | 0.67 | 8 | 41.0 | 0.025 | 0.0002 | 37 |
| 4 | 0.60 | 8 | 41.0 | 0.025 | 0.0002 | |
| 5 | 0.52 | 8 | 41.0 | 0.025 | 0.0002 | |
| 7 | 0.50 | 8 | 41.0 | 0.025 | 0.0002 | |
| 10 | 0.49 | 8 | 41.0 | 0.025 | 0.0002 | 33 |
| 12 | 0.37 | 8 | 41.0 | 0.025 | 0.0003 | |
| 13 | 0.30 | 8 | 41.0 | 0.025 | 0.0003 | |
| 17 | 0.26 | 8 | 41.0 | 0.025 | 0.0003 | 31 |
| 19 | 0.20 | 8 | 41.0 | 0.025 | 0.0004 | |
| 23 | 0.10 | 8 | 41.0 | 0.025 | 0.0004 | |
| 27 | 0.06 | 8 | 41.0 | 0.025 | 0.0004 | |
| 32 | 0.02 | 8 | 40.0 | 0.025 | 0.0005 | |
| 36 | 0.015 | 6 | 39.5 | 0.025 | 0.0005 | 35 |
| 38 | 0.010 | 6 | 39.5 | 0.025 | 0.0005 | |
| 42 | 0.006 | 6 | 39.0 | 0.025 | 0.0006 | |
| 47 | Nil | 6 | 39.0 | 0.025 | 0.0007 | |
| 50 [2] | | | | | | |

[1] Aryl-mercaptan added.
[2] Caustic change.

It will be noted in Run #1, before hydrazine injection, that the effective aryl mercaptan content of the catalyst solution was exhausted in about 10 days and needed replenishment. However, after hydrazine injection some 20 to 25 days elapsed before the aryl mercaptan was comparatively exhausted. Again, in each instance the quality of the gasoline both as to its RSH content and to its color was markedly better.

EXAMPLE V

Thermally cracked gasoline of 125 to 430° F. B.P. containing 0.024 weight percent RSH as sulfur is sweetened by first passing it through a caustic pre-wash tower containing 35 Bé. caustic. The gasoline is flowed through a first scrubber at a rate of 25 gallons per minute together with 1½ cubic feet of air. The scrubber contains 25 volume percent of acid oil in 35 Bé. caustic having an aryl mercaptan content of 2.0 weight percent. The caustic is not recirculated, but instead into the top of the scrubber tower is injected ¼ gallon per day of 44.8 weight percent hydrazine in water. After leaving the first catalytic scrubbing tower, the partially sweetened thermal gasoline is passed to a second scrubber which contains 35 Bé. caustic having 30 weight percent of acid oil and 2 weight percent of aryl mercaptans. The caustic in this second tower is recirculated from the bottom to the top at a rate of 800 gallons per hour and more of the same hydrazine solution is injected into the second scrubber tower at the same rate of ¼ gallon per day. For ease of handling, the ¼ gallon of 44.8 weight percent hydrazine may be diluted with 5 gallons of water.

The following table illustrates approximate costs and comparable data obtained in the several treatments including the one of this example.

*Table IV*

|  | Lt. Cat. Gasoline | | Thermal-Coker | |
|---|---|---|---|---|
|  | Before | After | Before | After |
| Caustic Used, lbs./mo | 18,000 | 1,800 | 20,000 | 6,000 |
| Total Treating Cost, c./bbl | 1.0 | 0.40 | 4.0 | 2.0 |
| Percent RSH Average | 0.0006 | 0.0002 | 0.0009 | 0.0003 |
| Color Average | 135 | 35 | 300 | 135 |
| Air Rate ft.³/min | 3.0 | 1.0 | 3.0 | 1.0 |

Certain modifications will occur to those skilled in the art. For example, in the instance of difficultly sweetened coker or thermal naphthas further sweetening agents or treatments, for example addition of ethylene oxide, or phenylene diamine and others known in the art and even shown in some of my prior patents, may be applied as subsequent sweetening treatments. The sweetened naphtha may have other additives for improving the stability and color added after the sweetening treatment. Some advantage in the rate of sweetening is available by supplying moderate amounts of heat, up to the initial boiling point of the naphtha under the pressure of the system, to the caustic catalytic solution or the naphtha or both during the sweetening, and, consequently, while the present process is adapted for operation at moderate or ambient temperatures, heat can be applied. The system is usually operated at a moderate pumping pressure which can be increased or decreased slightly depending upon useful refinery pressures.

I claim:

1. The method of sweetening a sour hydrocarbon naphtha containing a small quantity of sour components comprising scrubbing the said sour naphtha with a catalyst solution containing strong aqueous caustic, from 0.01 to 3 weight percent of aromatic mercaptans, at least 10 volume percent of acid oils, and a small quantity of hydrazine in the presence of an oxygen-containing gas.

2. The method as defined in claim 1 wherein the naphtha is catalytically cracked naphtha.

3. The method as defined in claim 1 wherein the naphtha is thermally cracked naphtha.

4. The method as defined in claim 1 wherein the sour naphtha is first pre-washed with strong aqueous caustic.

5. The method of sweetening sour hydrocarbon naphtha containing a small quantity of sour components, comprising first pre-washing the sour naphthas with strong 20–50 Bé. aqueous caustic and then scrubbing the naphtha with a 30 to 45 Bé. caustic catalyst solution containing from .01 to 3 weight percent of aromatic mercaptans, 5 to 35 volume percent of phenolic acid oils, and a trace of hydrazine in the presence of 1 to 3 cu. ft. per min. of air passed into the naphtha while scrubbing at a rate of 13 to 100 gallons per minute.

6. The method as defined in claim 5 wherein the sour naphtha is a difficultly sweetened thermal gasoline and is subjected to a second catalytic scrubbing treatment following the first catalytic scrubber treatment.

References Cited in the file of this patent

UNITED STATES PATENTS

| 2,862,804 | Petty | Dec. 2, 1958 |
| 2,930,750 | Wendland | Mar. 29, 1960 |
| 3,092,569 | Petty | June 4, 1963 |